UNITED STATES PATENT OFFICE 2,191,301

INSECTICIDE

Lloyd E. Smith, Washington, D. C., assignor to Henry A. Wallace, as Secretary of Agriculture of the United States of America, and his successors in office No Drawing. Application October 3, 1939, Serial No. 297,729

4 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

My invention relates to the improvement in materials for destroying or checking the growth or multiplication of living organisms, whether plant or animal, which are economically injurious to man.

An object of this invention is to provide a material for use as an insecticide.

Another object of this invention is to provide a material which is relatively non-toxic to man and warm blooded animals when taken by mouth and which can be used in the place of lead arsenate and other arsenicals commonly used for destroying insects without leaving a harmful residue on fruits and vegetables.

I have found that the class of compounds known as phenyl iodochlorides and the nitro derivatives thereof are effective in killing many species of insects whether applied externally or internally; that these organic compounds may be sprayed or dusted upon delicate foliage without injuring it; that these compounds are as effective as lead arsenate and other commonly used insecticides and that they are relatively non-toxic to warm blooded animals.

These compounds may be reduced to impalpable powder by grinding and applied to vegetation either dry as a dust or wet as a spray. The products being soluble in oils may be applied as a component of an oil emulsion spray. When applied as a spray in water it may be desirable to incorporate an effective wetting agent, such as one of the so-called sulfonated oils. For certain purposes the addition of a suitable adhesive or "sticker" may be advisable. These products may also be applied by dissolving them in an appropriate solvent such as acetone and pouring the resulting solution into water whereupon a fine colloidal precipitate is formed. This may be applied directly to the host plant or may be combined with a suitable wetting agent or adhesive and then sprayed. As examples of the toxicity of this class of compounds the following results were obtained:

When applied as a dust at a concentration of 435 micrograms per square centimeter, m-nitrophenyliodochloride killed 100% of the fourth instar of the Colorado potato beetle, fourth instar of the southern army worm, the fifth instar of Hawaiian beet webworm, the fourth instar of the melon worm, and the fourth instar of the southern beet webworm.

p-Nitrophenyliodochloride used as a dust at a concentration of 510 micrograms per square centimeter gave a 76% kill of the fourth instar of the melon worm larvae. Used as a spray at a concentration of one part in 400 parts of water this same compound killed 80% of the second instar of the tobacco hornworm larvae and when used at a concentration of 2 pounds to 50 gallons of water against the codling moth larvae 97.9% were killed.

o-Nitrophenyliodochloride used as a dust at a concentration of 560 micrograms per square centimeter killed 100% of the sixth instar of the Colorado potato beetle larvae, 100% of the fourth instar of the southern army worm larvae and the fourth instar of the diamondback cabbage worm.

Having thus described my invention, I claim:

1. An insecticide containing as its essential active ingredient phenyliodochloride.

2. An insecticide containing as its essential active ingredient o-nitrophenyliodochloride.

3. An insecticide containing as its essential active ingredient m-nitrophenyliodochloride.

4. An insecticide containing as its essential active ingredient p-nitrophenyliodochloride.

LLOYD E. SMITH.